April 21, 1936.  G. HERBSTER  2,038,289
SOLENOID STOP VALVE
Filed Aug. 23, 1933
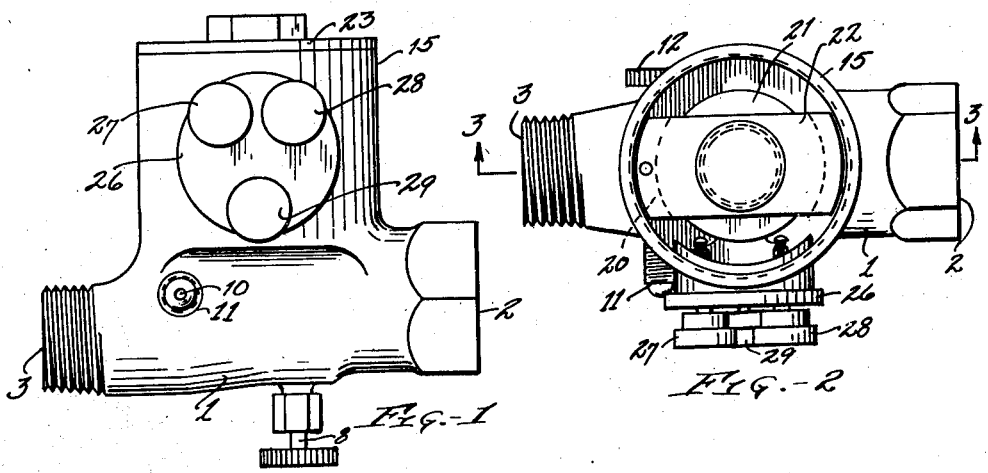
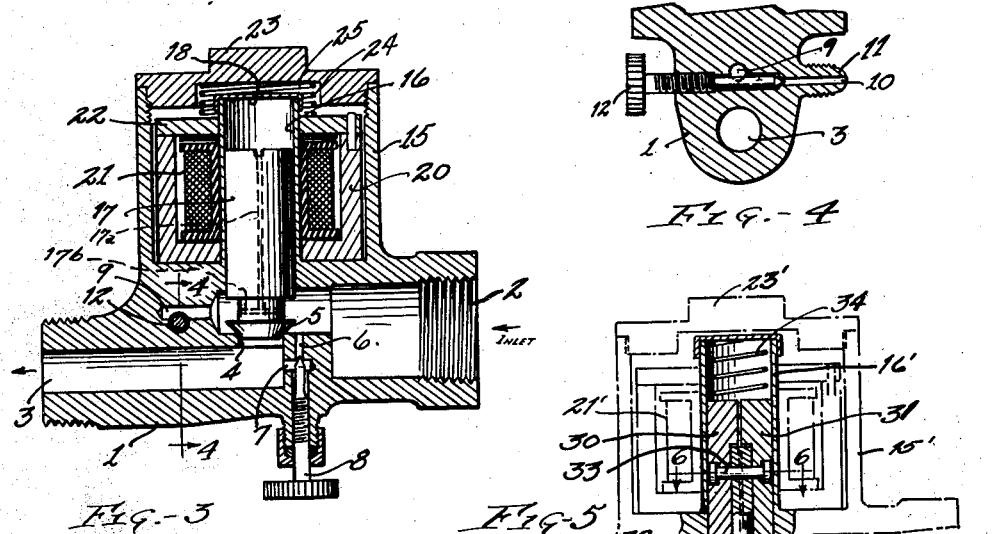
INVENTOR
George Herbster,
BY
Soule & Leonard,
his ATTORNEYS Patented Apr. 21, 1936

2,038,289

UNITED STATES PATENT OFFICE 2,038,289

SOLENOID STOP VALVE

George Herbster, Cleveland, Ohio

Application August 23, 1933, Serial No. 686,429

5 Claims. (Cl. 137—139)

This invention relates to a solenoid operated stop valve for controlling the flow of fluids, and particularly to a valve of the solenoid type for use in connection with gas burning appliances such as water heaters and the like.

Heretofore in operation of valves of this character with alternating electrical current, considerable difficulty has been experienced due to chattering of the operating mechanism with consequent annoying noise and also uneven wear and damage to the working parts.

An object of the present invention is to provide a valve of this character which may be operated by alternating electrical current and which, in operation, will be free from chattering and vibration when the electric circuit is energized.

Another object of the present invention is to provide a solenoid operated valve in which the coil and electrical parts are completely isolated from the liquid or fluid passing through the valve body so that there is no possibility of contact of the fluid with the electrical elements.

A correlative object is to provide a valve operated by such an isolated coil which has no moving parts extending out of the valve body whereby packing glands and the like are unnecessary.

A more specific object is to provide a valve of this character which is simple in construction and which may be manufactured and assembled economically by the usual quantity production methods.

Other objects and advantages will become apparent from the following specification wherein reference is made to the drawing.

In the drawing:

Fig. 1 is a front elevation of a valve illustrating the preferred form of the invention;

Fig. 2 is a top plan view of the valve illustrated in Fig. 1, the cover plate being removed for clearness in illustration;

Fig. 3 is a cross sectional view taken on a plane indicated by the line 3—3 in Fig. 2;

Fig. 4 is a fragmentary sectional view of a portion of the valve and is taken on a plane indicated by the line 4—4 of Fig. 3;

Fig. 5 is a diagrammatic side elevation of a modified form of the valve, the modified portion being shown in section for clearness in illustration;

Fig. 6 is a sectional view taken on a plane indicated by the line 6—6 of Fig. 5; and Fig. 7 is a diagrammatic illustration of the water heater and tank illustrating one use of the valve and the electrical connections untilized therefor.

Referring to Figs. 1 to 4 the valve is illustratively shown for use in connection with a gas water heater and comprises a hollow body member 1 having an inlet passage 2 and a discharge passage 3, the former for communication with a source of fuel and the latter for communication with a service or other burner. The passages 2 and 3 communicate interiorly of the body 1, a valve seat 4 being provided intermediate the passages. A valve plug 5 is arranged for seating on the seat 4 preferably on the inlet side, for communicating and discommunicating the passages 2 and 3, as will later be described.

In event of failure in operation due to failure of the electrical power or for any reason, a by-pass is provided for communicating the inlet passage 2 with the discharge passage 3 around the valve. This by-pass may comprise a duct 6 communicating the interior of the body on the inlet side of the valve with an intersecting duct 7, the duct 7, in turn, communicating with the discharge passage on the opposite side of the valve. A suitable hand operated needle valve 8 is provided for blocking the passage 6 when the by-pass is not in use.

In general, the valve may be utilized for control of fluids in various systems but when provided for use in connection with gas burners and the like it is usually necessary to provide means for feeding gas to a pilot burner as well as to a service burner. For this purpose a duct 9 is arranged for communicating the interior of the body preferably on the inlet side of the plug, with an additional duct 10, which latter is arranged for communication with a feed line to the pilot burner. In the form illustrated, a protuberant threaded portion 11 is provided on the body for effecting connection with the pilot feed line so as to communicate the duct 10 therewith. A hand operated needle valve or adjusting screw 12 is mounted in the body for regulating the flow of gas through the duct 10 to the pilot.

Heretofore, in valves of this character, it has been the practice to seat or unseat the plug by means of a spring and to utilize, for seating the plug, a solenoid or electromagnetic coil responsive to a suitable thermostat. In such a device, the coil not only must move the plug to seated position and hold it firmly therein but, in doing so, also must overcome the resistance of a spring. As a result, an extremely large coil or a high degree of power is required to operate the valve, the amount required being disproportionate to the result to be effected. Furthermore, in such devices, the arrangement of the working parts by which the plug is moved to seated and unseated positions is such that fluid often enters or comes in contact with the electrical parts of the valve, or parts of the operating mechanism must extend out of the valve body and be packed to prevent leakage. Such packing creates a high degree of frictional resistance which must be overcome during each operation. All of these disadvantages are overcome in the present valve by the operating structure now to be described.

Surmounting the valve body and preferably integral therewith is a housing 15 open at the upper end. Coaxial with this housing is a plunger guide, preferably in the form of a hollow cylinder 16 of non-magnetic material, the lower end of which extends through the wall of the valve body and communicates with the interior of the body, for example, on the inlet side of the seat 4. The guide 16 is preferably coaxial with the seat 4 and integral with the valve body or at least sealed to prevent communication between the interior of the valve body and the space between the cylinder 16 and housing 15. Disposed within the guide 16 and reciprocable axially thereof is a plunger 17, the lower end of which engages the valve plug 5 so that, upon reciprocation of the plunger 17, the valve plug 5 is lifted from and lowered onto the seat 4 for opening and closing the valve. Since the valve seats from the inlet side of the seat, the fluid pressure in the passage 2 tends to seat the valve more firmly on its seat and thus the pressure of the fluid itself is utilized in assisting the maintenance of sealing engagement of the valve and seat. The plunger 17 is preferably solid metal, such as steel, having sufficient weight to seat the valve 5 by gravity.

The guide 16 is sealed at the upper end by a suitable cap 18 so as to prevent the leakage of any fluid outwardly thereof. Within the annular space between the guide 16 and housing 15 is disposed a U-shaped bar 20 having a passage through its base adapted to receive and snugly embrace the outer wall of the guide 16 and having its arms disposed upwardly. An electromagnetic solenoid coil 21 is disposed about the plunger guide 16 as a center and extends the major portion of the length of the guide. Across the upper end of the arms of the bar 20 is a suitable binding strap 22, of metal, likewise provided with a central opening adapted to receive the upper end of the guide 16. The bar 20 and strap 22 are preferably of soft iron, the valve body and housing being of magnetic or non-magnetic material.

The upper end portion of the housing 15 is threaded internally to receive a complementarily threaded closure plate 23. The plate is provided with a central depression 24 adapted to receive the upper end of a compression spring 25, the lower end of which spring abuts the bar 22, so that upon screwing the cap firmly in position the spring will be compressed and hold the bar 22 firmly in position against the upper ends of the bar 20.

Mounted on the housing 15 is a triple binding post plate 26 of insulating material, having electrical binding posts 27, 28 and 29 respectively insulated from each other and from the valve body. Opposite termini of the coil 21 are connected to the posts 27 and 28 respectively.

Referring to Fig. 7 in which one use of the device is illustrated diagrammatically, the discharge passage 3 communicates with a service burner S arranged for heating the usual hot water heating device H communicated with the tank B, the pilot P being provided and arranged for communication with the duct 10 of the valve. The binding post 29 is provided so that two thermostats can be connected readily in series and the valve made responsive to close when either thermostat breaks the circuit and to open only when both thermostats are in contact. For example, a thermostat T¹ is provided on the tank and a thermostat T² provided near the pilot burner. These thermostats are connected in series either directly with a 110 volt alternating or direct circuit, or if desired, with a 110 volt A. C. transformer. One wire from each of the thermostats T¹ and T² may thus be connected with the respective binding posts 27 and 28 thus placing the thermostats and coil 21 in series. The other wires from the two thermostats may go to the common binding post 29 to complete the series connection. If only one thermostat is used, the binding post 29 of course is unnecessary.

The valve is preferably so arranged that when the electric circuit is open, the plug is in seated position, as shown in Fig. 3, having moved to seated position due to its weight and being held in such position by its weight and by pressure of the fluid on the inlet side of the valve. The thermostat T¹, makes contact when the water in the tank is cold and breaks contact when heated a predetermined degree thereby. The thermostat T² makes contact when heated by the pilot and breaks contact when cooled consequent upon extinguishing of the pilot. Thus either extinguishing the pilot or overheating the water opens the circuit so that the valve closes. A hand switch C may be provided also for breaking the circuit if desired. When the thermostats are closed so as to energize the coil 21, the flux lifts the plunger 17 until it is positioned longitudinally centrally of the coil 21, thus opening the valve. Since no spring need be overcome in either direction, the usual chattering and vibration is eliminated and only a very faint A. C. hum, which is hardly detectable, is present. If for any reason the electric circuit is broken, or the power is accidentally shut off, the plunger is released by the coil and the plug immediately seats, thus rendering the device entirely safe. The plunger, as stated, is preferably made of steel or soft iron, and is so connected to the plug that its own weight is added to the plug for assisting in seating.

Other metals may be used, however, especially with alternating current, as the current induced in the plunger, resulting from reversal of the A. C. current in the coil, lags sufficiently behind the reversal in the coil that the normally non-magnetic metal is properly energized to react to the flux and be, in fact, magnetically responsive. In the use of direct current, the thermostats can be arranged so as to connect the circuit for flow in the reverse direction from that in which it was flowing when opened, thus energizing the coil to produce an opposite flux and positively move the valve to closing position as well as open. In this latter instance, a plunger of permanently magnetizable material such as steel or iron is used.

It should be noted that the guide 16, as above mentioned, is sealed at the upper end so that it communicates only with the interior of the valve body. Consequently, the plunger 17 does not require packing, but, in fact, is sufficiently loose within the guide 16 to permit fluid to pass around the plunger to the sides and upper end thereof. Consequently, being resisted by only the fluid pressure acting on the plug portion actually exposed within the limits of the seat it is freely movable unimpeded by any force other than its own weight, and, if connected to the plug, the weight of the plug, and fluid pressure within the limits of the seating area. The plunger is vented by ducts 17a and 17b so that fluid may pass freely through the plunger to and from the guide 16 and not impede its movement.

Referring to Figs. 5 and 6, a valve similar to the valve illustrated in Figs. 1 to 4 inclusive, except for the electromagnetic device, is illustrated. In some cases it becomes necessary to place a valve in a position wherein it will not operate effectively by gravity but must be spring seated. The valve illustrated in Fig. 5 is provided for such purpose.

In the form illustrated in Fig. 5 the various parts corresponding to parts above are designated by corresponding prime numerals, these parts being in every way the same. In this form the plunger comprises two substantially semi-cylindrical segments 30 and 31, adapted to fit into the cylinder or guide 16' when in their normal position so as to reciprocate freely therein. The valve plug 5' is provided with a stem 22 which is loosely accommodated in a suitable bore in and coaxial with the segments 30 and 31 forming the plunger. The segments 30 and 31 are secured to the stem 32 by a transversely extending pin 33, the pin 33 mounting the segments so that they may slide radially outwardly and inwardly thereon a sufficient amount to firmly engage the guide side walls as an abutment when moved outwardly. A compression spring 34 is provided, the spring being located preferably in the upper end of the cylinder guide 16', abutting the closure cap at its upper end and the segments 30 and 31 of the plunger at the lower end for urging the valve into seated position. If it is desired to unseat the valve by a spring, the spring can be arranged beneath the plug in any well known manner. When the coil 21' is energized, it reacts on the segments 30 and 31 and lifts them axially in the guide 16' to unseat the valve 5' at the same time overcoming the resistance of the spring 34 and compressing the same. Ordinarily, when the plunger has reached its central position within the coil, and is holding the valve unseated with the spring 34 compressed, a chattering occurs. However, since the segments 30 and 31 are free to move outwardly on the pin 33 and since there is a lag between the reversals of flux in the segments 30 and 31 in relation to the reversal in the coil, as soon as the segments have reached the central position they spread apart and are held by the magnetic flux firmly against the side wall of the guide 16', thus frictionally locking them in fixed longitudinal position in the guide as well as by the direct electromagnetic effect. By this arrangement the spring is held firmly in compressed condition and the segments themselves remain firmly against the walls of the cylinder 16' so that neither they nor the spring nor other moving parts vibrate.

It is apparent from the foregoing description that the forms of solenoid valves there illustrated will operate without chattering at all times, will require a minimum of electrical energy for their operation and will remain in good operating condition under the most adverse conditions of use.

Having thus described my invention, I claim:
1. A solenoid operated fluid valve comprising a hollow body having an inlet passage and an outlet passage, a valve seat intermediate said passages, a valve plug movable toward and away from the seat and cooperable therewith when so moved to open and close the valve respectively, a plunger guide, a radially expansible plunger mounted in the guide for travel in opposite directions and operably connected to the plug for moving the plug, an electromagnetic coil operable when energized to effect travel of said plunger in one direction in the guide and to expand said plunger radially into firm contact with said guide after effecting said travel means to return the plunger in the opposite of said directions when the coil is unenergized and said plunger being readily contracted from its expanded condition consequent upon unenergization of said coil.

2. A solenoid operated fluid valve comprising a hollow body having an inlet passage and an outlet passage, a valve seat intermediate said passages, a valve plug movable toward and away from the seat and cooperable therewith when so moved to open and close the valve respectively, a plunger guide member, a plunger member mounted in the guide member for travel in opposite directions longitudinally of the guide member and operably connected to the plug, for moving the plug to open and closed positions respectively, a portion of one of said members being magnetically responsive and movable radially of the plunger member relatively toward and away from a portion of the other of said members, said relatively movable portions being engageable when moved radially in one of said radial directions, electromagnetic means operable when energized to effect travel of the plunger member in one direction longitudinal of the guide members and to move the said relatively movable portions of said members radially into firm contact with each other after effecting said travel.

3. A valve comprising a hollow body having an inlet passage and an outlet passage, a valve seat intermediate said passages, a valve plug movable toward and away from the seat and operable when so moved to open and close the valve respectively, a stem on said plug, a plunger guide, a plunger within said guide movable in opposite directions and connected to said stem, said plunger comprising a plurality of magnetically responsive segments, said segments being movable outwardly and inwardly radially of the guide and operable when moved outwardly to firmly engage the guide wall, means urging said plug to one operating position, electromagnetic means operable when energized to move said plunger in one of said first mentioned opposite directions whereby the plunger moves to the longitudinal center of the coil and to move said segments outwardly into firm contact with the guide wall.

4. A valve comprising a hollow body having an inlet passage and an outlet passage, a valve seat intermediate said passages, a valve plug movable toward and away from the seat and operable when so moved to open and close the valve respectively, a reciprocable plunger cooperable with the plug to move the plug in one direction consequent upon movement of the plunger in one direction, said plunger being magnetically responsive and radially expansible, a plunger guide mounting said plunger for reciprocating movement, means urging said plug to one operating position, electromagnetic means operable when energized to move said plunger in one direction along the guide and operable to expand the plunger a sufficient degree to effect interlocking engagement thereof with said guide.

5. In a solenoid plunger operated stop valve, a valve body having a closed compartment, a plunger guide coaxial therewith and of smaller cross sectional area than the compartment, the space between the guide and walls of the compartment being sealed from communication with fluid passing through the interior of the valve body, coil means disposed between the guide and enclosing wall of the compartment, transversely extending flux conducting bars in the compartment at opposite ends of said guide and additional bars of flux conducting material in said compartment connecting the corresponding ends of the first mentioned bars, said coil means being in flux inducing relationship to said bars, said plunger guide extending longitudinally in both directions beyond the transverse flux conducting bars, a plunger responsive to the flux of said coil and accomodated in the guideway for movement longitudinally therealong, whereby the plunger may move to positions wherein part of the plunger lies in the plane of one of said transverse bars.

GEORGE HERBSTER.